Patented Dec. 9, 1941

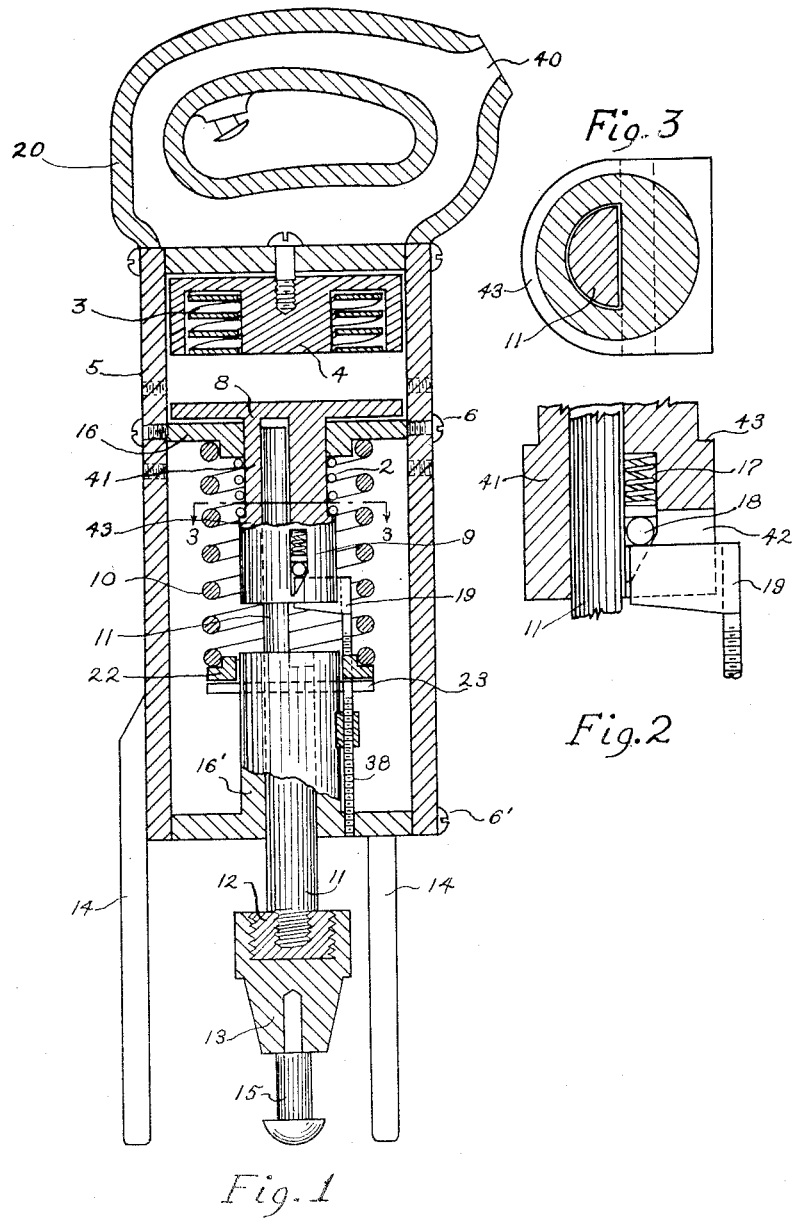

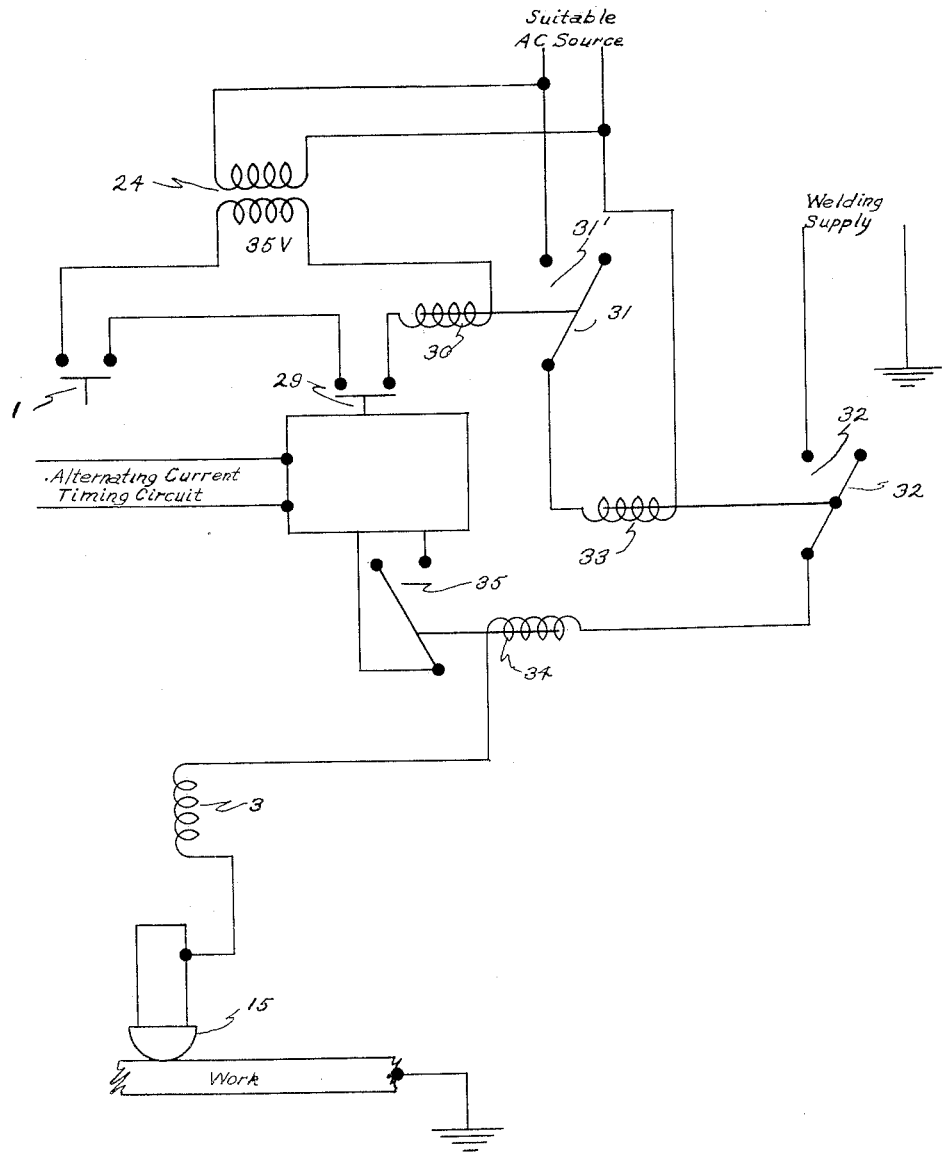

2,265,169

UNITED STATES PATENT OFFICE 2,265,169

WELDING GUN

Grover A. Hughes, Seattle, Wash., and John H. Brownfield, United States Navy

Application March 17, 1941, Serial No. 383,780

9 Claims. (Cl. 219—4)

(Granted under the act of March 3, 1883, as amended April 30, 1928; 370 O. G. 757)

This invention relates to electric arc welding guns of the type disclosed in U. S. Patent 1,995,001, issued March 19, 1935, to Ito, and U. S. Patent 1,359,620, issued Nov. 23, 1920, to Ritchey et al., and embodies certain improvements designed to overcome many of the difficulties and disadvantages encountered in the operation of the guns of the aforementioned patents. In welding guns of this type the material held by the gun is automatically moved to a predetermined distance away from the other material to which it is to be welded in order that a suitable electric arc may be drawn between such materials to heat the materials so that a weld may be formed when they are automatically moved into contact with each other by the gun at the end of the welding cycle.

In the prior art, to which reference has been made above, a high voltage coil in the form of an iron clad solenoid magnet is used for drawing the arc between the stud and the work. This necessitates a high voltage of approximately 220 volts and a coil of a large number of turns, in order that the electro-magnet may develop sufficient pull to compress the spring which is used to force the stud into the molten crater at the end of the arcing period. This separate high voltage is always obtained at a disadvantage to the operator, since it requires extra leads of heavy insulation and added protective precautions by the operator when working on steel decks. The drooping voltage characteristics of the modern welding generator make the operation of these guns uncertain when their solenoids are connected directly across the terminals of the welding generator.

In order to obtain consistently satisfactory welds three constants must be maintained, namely: the length of arc, the time of current flow, and the value of the current. All the welding guns of the prior art have failed under actual operating conditions to maintain these fundamental requirements. While welding on perfect plane surfaces with excellent electrical contact, the welds were satisfactory, but when applied to production problems on board ship where such favorable conditions are not often encountered, it was found that in order to maintain a constant length of arc some other means of adjustment, in addition to the manual adjustment usually provided for each leg, was required. Our invention overcomes this disadvantage of the prior art by providing a clutch which automatically adjusts for the unevenness of the surfaces or the unequal length of studs.

In actual use on shipboard the contact resistance between the stud and the welding surface is not often constant and under some conditions where excessive scale and paint are encountered this contact resistance is so high that the timer may have completed a portion of its cycle before the arc is finally struck, and the arcing time set is thus shortened, with the result that defective welds are produced. We have overcome this disadvantage by using a series relay in the welding circuit which is current responsive and which operates only after the current flowing between the stud and the work has reached a predetermined value. This relay controls the operation of the tube timer, thereby insuring that the arc is maintained throughout the timing period.

It is, therefore, an object of this invention to produce a welding gun which will operate satisfactorily when connected directly to the welding circuit without any additional high voltage supply.

It is a further object of our invention to provide a welding gun which will maintain a constant length of arc under all operating conditions, regardless of the unevenness of the welding surfaces.

It is a further object of our invention to provide a welding gun which under all conditions of operation, irrespective of surface contact resistance, will maintain the arc for the entire timing period.

It is also an object of our invention to provide a light weight welding gun particularly adapted for overhead welding operations.

With the foregoing and other objects in view, the invention consists in the construction, combination and arrangement of parts hereinafter described and illustrated in the drawings, in which:

Fig. 1 is a longitudinal sectional view of an electric welding tool constructed in accordance with this invention;

Fig. 2 is an enlarged sectional view of a portion of the welding tool shown in Fig. 1, illustrating the details of the overrunning clutch;

Fig. 3 is a plan view of the details shown in Fig. 2; and

Fig. 4 is a wiring diagram of the control circuit.

The supporting structure of our present invention comprises a body portion 5, mounted upon a plurality of legs 14, each of which may be individually longitudinally adjustable in accordance with prior art practice. A suitable handle 20 is secured to the upper end of the body member. This handle is preferably a hollow structure having an opening 40 formed therein to accommodate the conductors from the control circuit, not shown. The handle also has an operator's switch 1 conveniently located therein. Arranged within the upper portion of the body member is an electro-magnet 3, comprising a solenoid coil which consists of but a few turns of a large conductor adapted to be connected in series with the welding stud. A core and yoke member 4 is provided for the magnet, thereby reducing the reluctance of this portion of the magnetic circuit. An armature 8 is slidingly supported in the bearing member 16, which is secured to the body member 5 by means of the screws 6 or other appropriate means. This bearing member may be adjustable longitudinally within the body member to change the distance of the armature from the electromagnet and thus to adjust the length of arc. We do not wish to be restricted to any particular means of adjustment, but in the embodiment disclosed the bores for said screws 6 may be placed at varying distances longitudinally along the body member. The armature member is provided with a socket forming portion 41 which is slidable in the bearing 16. A plunger rod 11 extends into the socket forming portion of the armature and is secured thereto by means of the overrunning clutch 9.

The details of the overrunning clutch are clearly shown in Figs. 2 and 3, and consists specifically of the following arrangement of parts: The rod 11 has a portion cut away in order to form a flat surface along one side thereof. This is clearly shown in Fig. 3. The lower end of the socket is provided with a cut away portion accommodating the compression spring 17 and the roller 18. The roller is held between the angular seat of the cut away portion of the socket and the flat surface of the rod 11. The compression spring 17 tends to push the roller downwardly against the angle seat so as to bind against the seat and the rod, thereby securing the rod to the armature socket. The socket also has a notched portion 42 formed therein to accommodate the adjustable knockout block 19 which lifts the roller 18 from its angle seat against the compression force of the spring 17, thereby releasing the armature from the plunger rod 11. The supporting portion 38 of the knockout block 19 is threaded so that it may be adjusted longitudinally of the body portion 5 in order that the block may engage the roller at different heights. Under varying conditions different lengths of arcs are used; therefore, it is obviously necessary that an adjustment must be provided for the knockout block if a constant length arc is to be obtained for any setting of the adjustable bearing plate 16. The socket is also provided with an outer collar 43. The coil spring 2 is compressed between this collar and the bearing 16 and holds the armature 8 against the bearing 16 when the armature is disengaged from the rod 11 and the coil 3 is not energized.

The plunger 11 slides in the bearing 16' which is secured to the end of the body member by means of the screws 6 or by other appropriate means. The chuck 13 designed to hold the stud 15 is secured to the rod 11 by means of the insulating connector 12.

The spring 10 is compressed between the bearing 16 and the washer 22. The spring pressure applied to the washer is transmitted to the plunger rod 11 by means of the pin 23. The bearing member 16' is provided with a suitable passageway for this pin (not shown) which permits the washer, pin, and plunger to move longitudinally of the body 5 a predetermined amount, and also prevents the plunger rod 11 from dropping out of the armature socket when the gun is removed from the work.

In the wiring diagram shown in Fig. 4, the transformer 24 is a typical small single phase power transformer for reducing the line voltage of the motor for the welding generator to about 35 volts. The output of the secondary of this transformer is connected to the contact switch 1 on the handle of the gun and in series with a relay coil 30, and the normally closed contacts 29. When switch 1 is closed, the coil 30 of relay 31 is energized, closing the circuit at 31'. When this occurs, the coil 33 of the relay 32 is connected directly across the A. C. supply for the motor and this coil closes the welding circuit at 32'. The current responsive relay coil 34 is in series with this welding circuit and operates to close the switch 35 to the timing circuit only after a sufficient current flow has been established in the welding circuit. The coil 3 is the solenoid coil of the electro-magnet shown in Fig. 1, and is connected in series in the welding circuit.

The operation of this device is as follows: The stud 15 is inserted into the chuck 13 and pressed against the work compressing spring 10 to a predetermined value of pressure. The legs 14 are adjusted so that they bear against the surface of the work. The overrunning clutch 9 located in the armature socket 41 permits the plunger 11 to move in and out as the roller 18 is lifted from the angle seat by the knockout block 19. This permits the stud to make contact on the work when the point of contact is above or below the plane of the legs 14 and may allow for variations of as much as one-half inch above and one-half inch below that plane for each setting of the legs, thereby making it unnecessary to manually adjust the legs for minor variations in the distance to the work due to evenness of the surface of the work, length of stud, etc. The gun is now ready to weld.

Switch 1 is closed and current flows through contacts 29 and coil 30, energizing this coil and closing contacts 31, which connects the coil 33 directly across the A. C. supply source, thus energizing this coil, which in turn closes the contacts 32 of the welding switch. The current now flows from the welding supply through the stud to the work. Current flowing through coil 34 closes contacts 35 which starts the tube timer 36, and current flowing through coil 3 energizes the solenoid which draws armature 8 toward it. As the roller 18 leaves the knockout block 19 it is firmly seated between the angular portion of armature socket 41 and plunger 11, locking them together, thereby drawing the stud from the work compressing spring 10, and establishing the arc of a length determined by the distance between the armature and solenoid when the armature 8 is against bearing 16. By changing the position of the bearing we control the length of the arc. At the predetermined interval of time set on the tube timer 36 contacts 29 are opened by that mechanism, the contacts 31 are opened, which in turn opens relay 32 and the welding circuit.

The relay switches 31, 32 and 35, are illustrated as normally open. Obviously, biasing means are commonly employed in this art to maintain these relays in their open position, and when the coil for each relay is energized the switch is closed against this biasing force.

As the flux decays in solenoid 3, springs 10 and 2 force the armature 8 away from the solenoid, the armature and plunger being locked together until roller 18 strikes knockout block 19, allowing the plunger to travel on freely under the pressure of spring 16 until the stud is firmly seated in the molten pool created by the arc.

Other modifications and changes in the proportions and arrangement of the parts may be made by those skilled in the art without departing from the nature of this invention, within the scope of what is hereinafter claimed.

The invention described herein may be manufactured and/or used by or for the governmental of the United States of America for governmental purposes without the payment of any royalties thereon or therefor.

We claim:

1. An electric arc welding device comprising a welding supply source, a holder for a metallic stud adapted to be end welded to a substantially flat metallic surface, yieldable means forcing said stud into electrical contact with said surface, electromagnetic means responsive to a predetermined value of current for moving said stud a predetermined distance away from said surface and against the action of said yieldable means, a control relay, a circuit for conducting the welding current from said supply source to said metallic stud including said electromagnetic means connected in series with said stud electrode through the contacts of said control relay, means including a timing circuit for governing the operation of said control relay so that the period during which the welding circuit is closed may be accurately determined and means controlling the energization of said timing circuit when the current flowing in the welding circuit has attained a value equal to the predetermined value of current necessary to operate said electromagnetic means whereby the arc will be struck only after the current flowing in said welding circuit has attained said predetermined value and the timing circuit will not start to function until the current has attained the said predetermined value so as to insure a constant value of current in the arc, and a constant time of arc sustentation for similar welding operations irrespective of the initial resistance at a point of contact of said stud and substantially flat metallic surface.

2. In an electric arc welding device comprising a supporting structure having a body portion, an electro-magnet at one end thereof, bearing means, an armature slidably supported therein and having a socket portion formed integrally therewith, a cut away portion in said socket forming an angular bearing seat, a longitudinally movable member supported in said body portion adapted to hold a metallic stud to be welded to a metallic object, said longitudinal member having a flat surface and extending into said socket with said flat surface facing said angular seat, automatically adjustable means for securing said armature to said longitudinally movable member comprising a roller positioned between the longitudinal member and the angular seat, spring means forcing said roller into said angular seat and against said flat surface thereby locking the armature and member together, and releasing means for engaging said roller to release said armature from said longitudinal member to allow for the free adjustment thereof.

3. In an electric arc welding device comprising, a supporting structure having a body portion, an electro-magnet at one end thereof, bearing means, an armature slidably supported therein, a longitudinally movable member adapted to hold a metallic stud to be welded to another metallic object, and automatically adjustable means for securing said armature to said longitudinally movable member so as to accommodate for any irregularities between the plane of the supporting structure and the surface if said other metallic object independent of manual adjustment.

4. The invention as defined in claim 3, wherein the bearing means may be adjusted longitudinally of the body portion in order that the distance of the armature from the electro-magnet may be changed so that the length of arc may be adjusted for studs of different diameter.

5. A welding device for end welding a stud electrode to a substantially flat metallic surface, a supporting structure, an electrode holder, an intermittent clutching device for said holder movable in said supporting structure, means mounted in said structure by which said clutching device moved in a direction causing gripping action whereby said electrode holder is moved a distance from the work determinable by the length of arc desired between an electrode in said holder and said substantially flat surface, means to move said holder to bring the electrode carried thereby into contact with said work when said first named means is rendered inoperative, and means responsive to movement of said clutching device in a reverse direction causing said device to release its grip on said holder whereby said holder may move freely and independently of said first named means so that the electrode may be firmly pressed against the work by said second named means.

6. A welding device comprising a supporting structure, an electrode holder adapted to hold an elongated piece of metal to be end welded to a substantially flat surface, means by which said holder is moved a distance from the work to establish an arc between the electrode in the holder and the work, said means including a member mounted in said structure and movable longitudinally thereof a predetermined distance which is adjusted for the desired length of arc between an electrode in said holder and the work, means for maintaining the predetermined length of arc constant irrespective of any irregularities in the surface of the work or in the length of the electrodes said means being independent of any manual adjustment of the supporting structure.

7. A device for arc welding an elongated piece of metal to a substantially flat metallic surface comprising a supporting structure having a body portion, a member movable therein and adapted to hold said elongated piece of metal so that the latter may form a stud electrode, means for moving the member and stud electrode outwardly of the body portion toward the plane established by the base of said supporting structure, means for moving said stud electrode and holder member a definite predetermined distance against the action of said first named means to strike an arc of a length equivalent to said definite predetermined distance, and means providing freedom of movement of said member relative to said last named means when said member is in the position in said body maintained by the action of said first named means only whereby the elongated piece of metal will contact said substantially flat metallic surface irrespective of any irregularities between the planes established by the supporting structure and the plane surface of the substantially flat piece of metal to provide a good electrical contact and to maintain a uniform length of arc.

8. An electric arc welding device, comprising a supporting structure having a body portion, a welding supply source, a longitudinally movable member adapted to hold a stud electrode to be welded to a metallic surface, means for forcing the stud electrode into electrical contact with the metallic surface, electrically operated means for moving the member longitudinally of said device away from said metallic surface and against the action of said first named means, relay means for connecting said electrically operated means to said welding supply source in series with said stud electrode, a timing means for controlling the operation of said relay means, a second relay responsive to the current magnitude in the circuit including the stud electrode and electrically operated means for controlling the operation of said timing means, and means automatically adjustable for securing said longitudinally movable member to said electrically operated means to accommodate for any irregularities between the plane of the supporting structure and the metallic surface as well as non-uniformity in the length of the stud electrode, whereby the length of arc, the period of the sustained arc, and the value of the current may be maintained constant.

9. An electric arc welding device comprising a supporting structure having a body portion, a welding supply source, a member movable within the body portion adapted to hold a stud electrode to be welded to a metallic surface into electrical contact with said surface, means connecting said stud to said welding supply source, means responsive to the current magnitude in the welding circuit for moving the stud out of contact with the said surface to establish an arc having a constant current, means for maintaining the period of current flow constant during the time the arc is maintained, and automatically adjustable means for maintaining the length of arc constant irrespective of any irregularities between the plane of the supporting structure and the metallic surface or any non-uniformity in length of stud electrodes, said means being independent of any manual adjustment.

GROVER H. HUGHES.
JOHN H. BROWNFIELD.